United States Patent
Jang et al.

(10) Patent No.: US 11,378,951 B2
(45) Date of Patent: Jul. 5, 2022

(54) METHOD FOR MONITORING AND CONTROLLING AUTONOMOUS VEHICLE

(71) Applicant: LG ELECTRONICS INC., Seoul (KR)

(72) Inventors: Yujung Jang, Seoul (KR); Sung Hwan Choi, Seoul (KR); Du Kyung Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 303 days.

(21) Appl. No.: 16/489,306

(22) PCT Filed: Mar. 21, 2019

(86) PCT No.: PCT/KR2019/003318
§ 371 (c)(1),
(2) Date: Aug. 27, 2019

(87) PCT Pub. No.: WO2020/189831
PCT Pub. Date: Sep. 24, 2020

(65) Prior Publication Data
US 2021/0325869 A1    Oct. 21, 2021

(51) Int. Cl.
*G05D 1/00* (2006.01)
*B60K 37/06* (2006.01)
(Continued)

(52) U.S. Cl.
CPC .......... *G05D 1/0038* (2013.01); *B60K 37/06* (2013.01); *G05D 1/0276* (2013.01); *G07C 5/008* (2013.01); *B60K 2370/175* (2019.05)

(58) Field of Classification Search
CPC .... G05D 1/0038; G05D 1/0276; B60K 37/06; G07C 5/008
See application file for complete search history.

(56) References Cited

U.S. PATENT DOCUMENTS

2016/0328976 A1    11/2016    Jo et al.
2018/0284809 A1    10/2018    Templeton
(Continued)

FOREIGN PATENT DOCUMENTS

AU    2006306522 A1 *    5/2007    ............. H04L 67/12
EP    3121084 A2 *    1/2017    .......... B60W 50/082
(Continued)

OTHER PUBLICATIONS

PCT International Application No. PCT/KR2019/003318, International Search Report dated Dec. 20, 2019, 3 pages.

*Primary Examiner* — Vivek D Koppikar
*Assistant Examiner* — Jeffrey R Chalhoub
(74) *Attorney, Agent, or Firm* — Lee, Hong, Degerman, Kang & Waimey PC (57) ABSTRACT

Disclosed herein is a method for allowing a user to monitor or control an autonomous vehicle after a drop-off of the user. The method for monitoring and controlling an autonomous vehicle according to an embodiment includes receiving user alighting information for an autonomous vehicle, identifying whether a destination is set for the autonomous vehicle, determining an operating mode of a user terminal as a monitoring mode or a controlling mode on the basis of whether the destination is set, and transmitting a driving state of the autonomous vehicle to the user terminal, or transmitting a control signal corresponding to user manipulation inputted to the user terminal to the autonomous vehicle, on the basis of the operating mode.

12 Claims, 9 Drawing Sheets

(51) Int. Cl.
G05D 1/02 (2020.01)
G07C 5/00 (2006.01)

(56) References Cited

U.S. PATENT DOCUMENTS

2019/0079518 A1* 3/2019 Arakawa .............. G05D 1/0088
2019/0164332 A1* 5/2019 Matsunobu ............... G06T 9/00

FOREIGN PATENT DOCUMENTS

| JP | 2018067172 | 4/2018 |
| KR | 1020140028657 | 3/2014 |
| KR | 101646134 | 8/2016 |
| KR | 1020180026243 | 3/2018 |

* cited by examiner

METHOD FOR MONITORING AND CONTROLLING AUTONOMOUS VEHICLE

CROSS-REFERENCE TO RELATED APPLICATIONS

This application is the National Stage filing under 35 U.S.C. 371 of International Application No. PCT/KR2019/003318, filed on Mar. 21, 2019, the contents of which are all hereby incorporated by reference herein in its entirety.

TECHNICAL FIELD

The present disclosure relates to a method for allowing a user to monitor or control an autonomous vehicle after a drop-off of the user.

BACKGROUND

In recent years, technologies for autonomous vehicles that can autonomously travel to destinations without drivers' operation have been developed. Like a conventional vehicle, a vehicle equipped with the function of autonomous driving may be controlled by a user. Additionally, unlike a conventional vehicle, a vehicle equipped with the function of autonomous driving may move to a destination autonomously.

Technologies for autonomous driving, which have been currently developed, are applied to a method for allowing a vehicle to move to a destination autonomously through communication between the vehicle and a server without a user's operation when the destination is set for the vehicle.

Still, most of the vehicles on the road are regular vehicles that are not equipped with the function of autonomous driving. Additionally, exceptional cases may occur to a regular vehicle depending on an individual user's operation. Considering exceptional cases, technologies for autonomous driving, which may be applied to an autonomous vehicle such that the autonomous vehicle immediately may handle an exceptional case, are required. However, it is difficult to develop these technologies.

Accordingly, a method not only for allowing a vehicle to move to a destination autonomously even after a drop-off of a user but also for allowing a user to monitor and control a vehicle that is moving autonomously any time is required.

DISCLOSURE

Technical Problems

The objective of the present disclosure is to allow a user to monitor and control an autonomous vehicle after a drop-off of the user.

Another objective of the present disclosure is to transmit a driving state of an autonomous vehicle to a user terminal in a monitoring mode.

Another objective of the present disclosure is to control an autonomous vehicle on the basis of user manipulation inputted to a user terminal in a controlling mode.

Another objective of the present disclosure is to transmit a map on which a driving state of an autonomous vehicle is displayed, or augmented data that display a driving state of an autonomous vehicle, to a user terminal, on the basis of an angle between the user terminal and the ground, in a monitoring mode.

Yet another objective of the present disclosure is to allow a user to control an autonomous vehicle when a driving event occurs to the vehicle that is moving autonomously.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

Technical Solutions

As a means to achieve the above-described objective, a method for monitoring and controlling an autonomous vehicle according to an embodiment includes receiving user alighting information for an autonomous vehicle, identifying whether a destination is set for the autonomous vehicle, determining an operating mode of a user terminal as a monitoring mode or a controlling mode on the basis of whether the destination is set, and transmitting a driving state of the autonomous vehicle to the user terminal or transmitting a control signal corresponding to user manipulation inputted to the user terminal to the autonomous vehicle, on the basis of the operating mode.

Advantageous Effects

The present disclosure may allow a user to confirm a driving state of an autonomous vehicle and to remotely control the autonomous vehicle without spatial and temporal constraints by allowing the user to monitor or control the autonomous vehicle after a drop-off of the user.

Further, the present disclosure may allow the user to confirm various pieces of information on the vehicle that is moving autonomously by transmitting a driving state of the autonomous vehicle to a user terminal in a monitoring mode.

Further, the present disclosure may enhance efficiency and convenience of remote control over the autonomous vehicle by controlling the autonomous vehicle on the basis of user manipulation inputted to the user terminal in a controlling mode.

Further, the present disclosure may provide a high-quality user experience (UX) by transmitting a map on which a driving state of the autonomous vehicle is displayed, or augmented data that display a driving state of the autonomous vehicle, to the user terminal, on the basis of an angle between the user terminal and the ground, in the monitoring mode, and by providing information in accordance with the user's intention toward monitoring methods.

Furthermore, the present disclosure may allow the user to directly intervene with exceptional cases that occur to the autonomous vehicle on the road, by allowing the user to control the autonomous vehicle when a driving event occurs to the vehicle that is moving autonomously.

Specific effects of the present disclosure together with the above-described effects are described in the detailed description of embodiments.

BEST MODE

The above-described objectives, features and advantages are specifically described with reference to the attached drawings hereunder such that one having ordinary skill in the art to which the present disclosure pertains may easily implement the technical spirit of the disclosure. In describing the disclosure, detailed description of publicly known technologies in relation to the disclosure is omitted if it is deemed to make the gist of the present disclosure unnecessarily vague. Below, preferred embodiments of the present disclosure are specifically described with reference to the attached drawings. Throughout the drawings, identical reference numerals denote identical or similar elements.

The present disclosure relates to a method for monitoring or controlling an autonomous vehicle by a user after a drop-off of the user.

Below, a system for monitoring and controlling an autonomous vehicle according to an embodiment, and a method for monitoring and controlling an autonomous vehicle by the system are specifically described with reference to the attached drawings.

Figure 1:
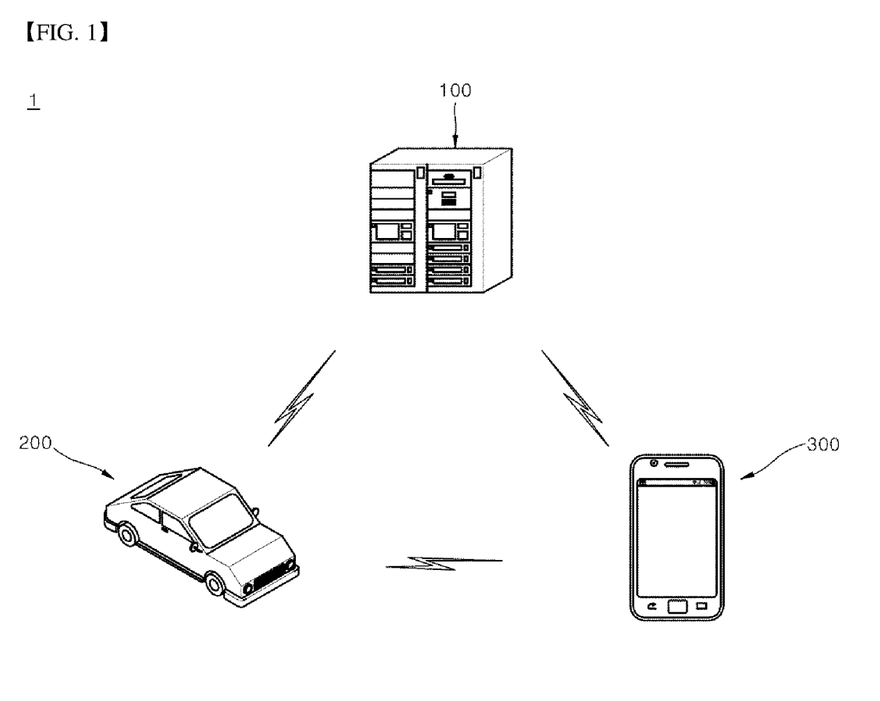
FIG. 1 is a view illustrating a system for monitoring and controlling an autonomous vehicle according to an embodiment.
Figure 2:
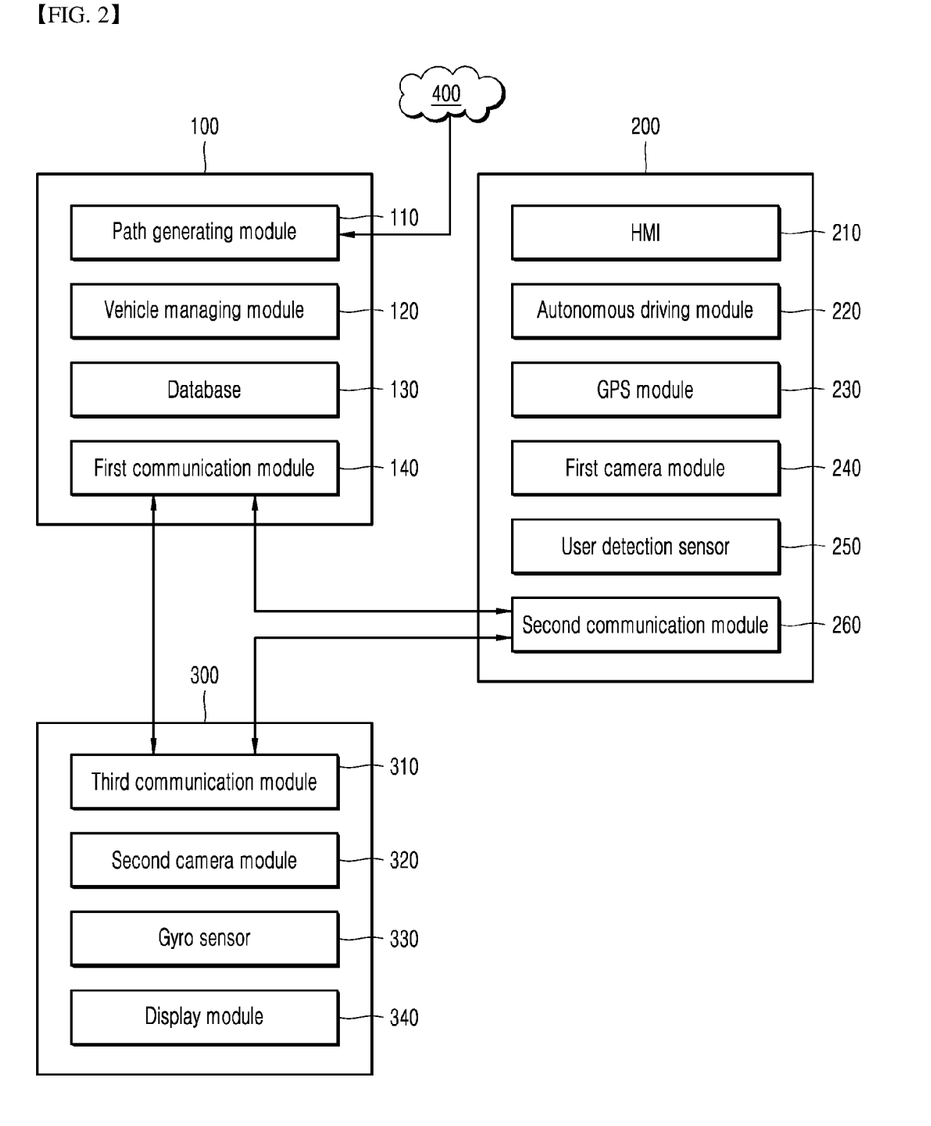
FIG. 2 is an internal block diagram illustrating the server, the autonomous vehicle, and the user terminal in FIG. 1.

FIG. 1 is a view illustrating a system for monitoring and controlling an autonomous vehicle according to an embodiment, and FIG. 2 is an internal block diagram illustrating the server, the autonomous vehicle, and the user terminal in FIG. 1.

Figure 3:
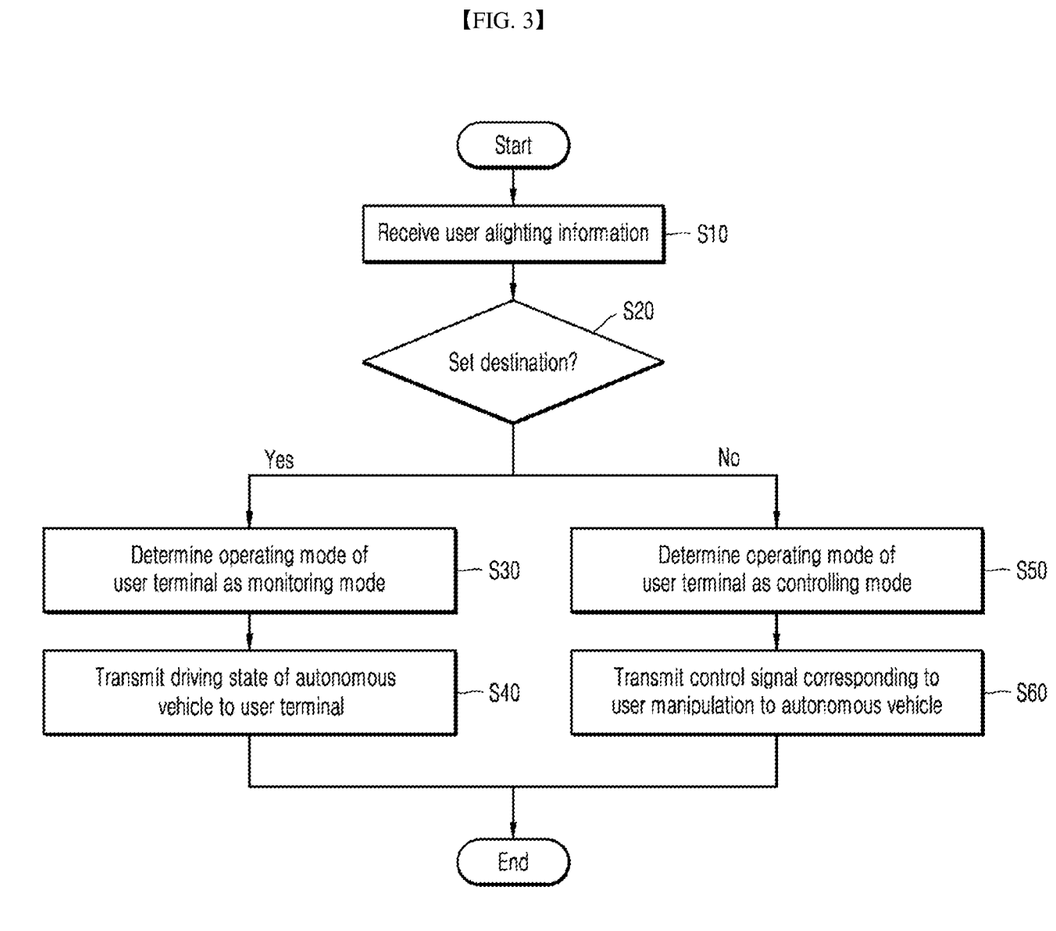
FIG. 3 is a flow chart illustrating a method for monitoring and controlling an autonomous vehicle according to an embodiment.

FIG. 3 is a flow chart illustrating a method for monitoring and controlling an autonomous vehicle according to an embodiment.

Figure 4:
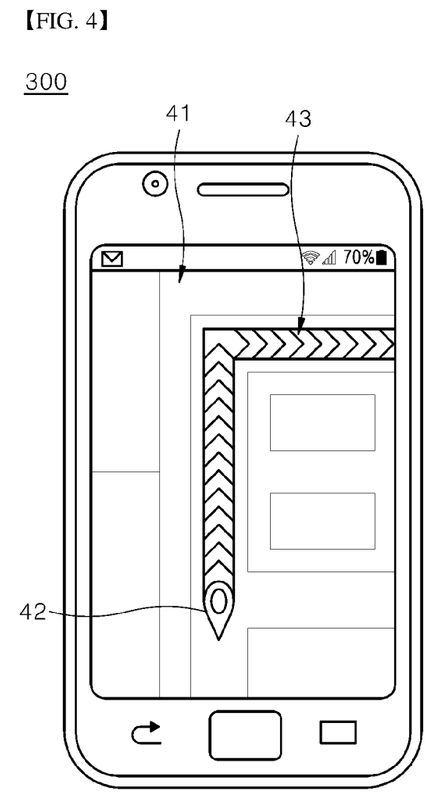
FIG. 4 is a view illustrating a map displayed on a user terminal, and the location and driving path of an autonomous vehicle, which are displayed on the map, in a monitoring mode.

FIG. 4 is a view illustrating a map displayed on a user terminal, and the location and driving path of an autonomous vehicle, which are displayed on the map, in a monitoring mode.

Figure 5A:
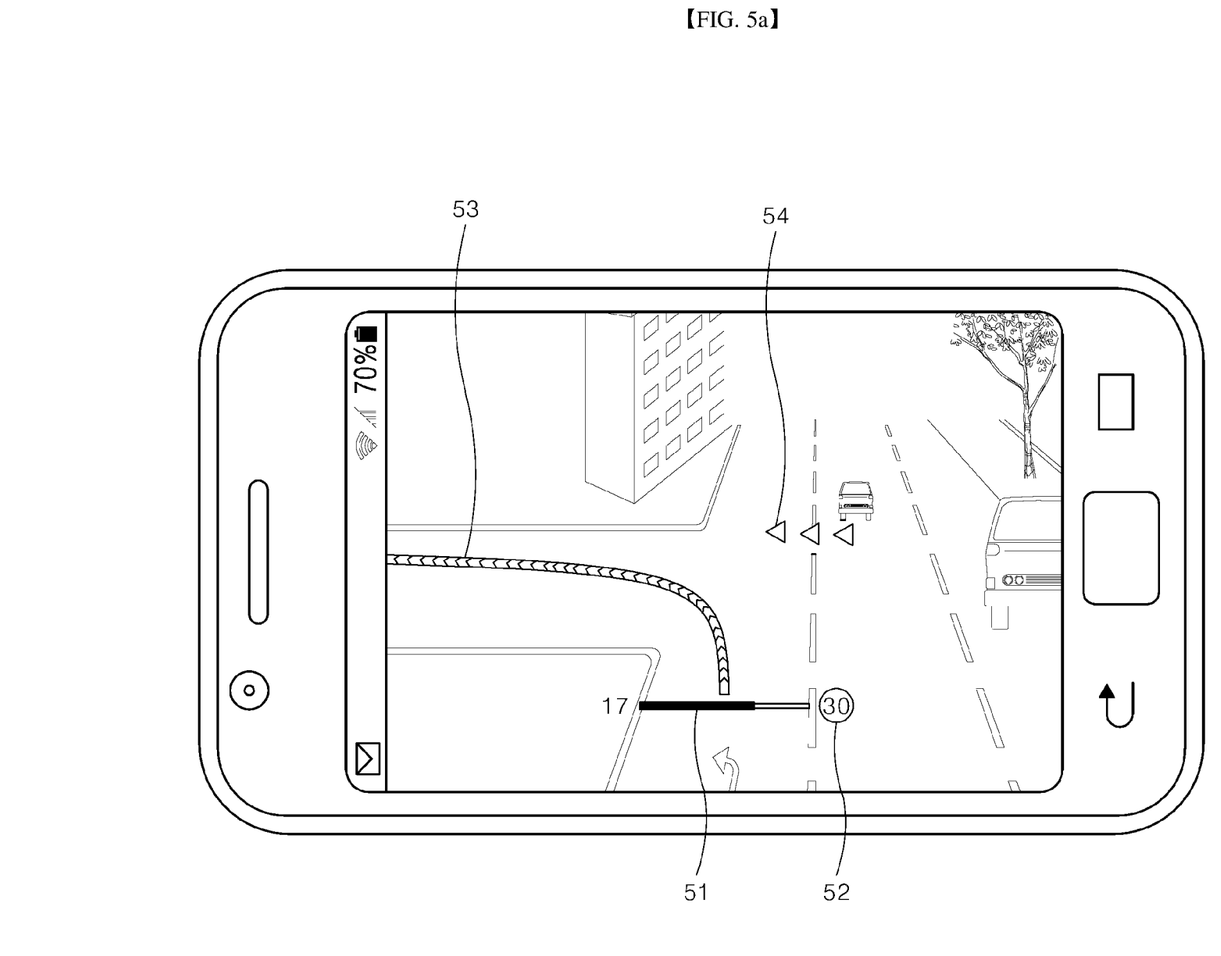
FIG. 5a is a view illustrating images recorded by an autonomous vehicle, which are displayed on a user terminal, and augmented images displayed in the recorded images, in a monitoring mode.
Figure 5B:
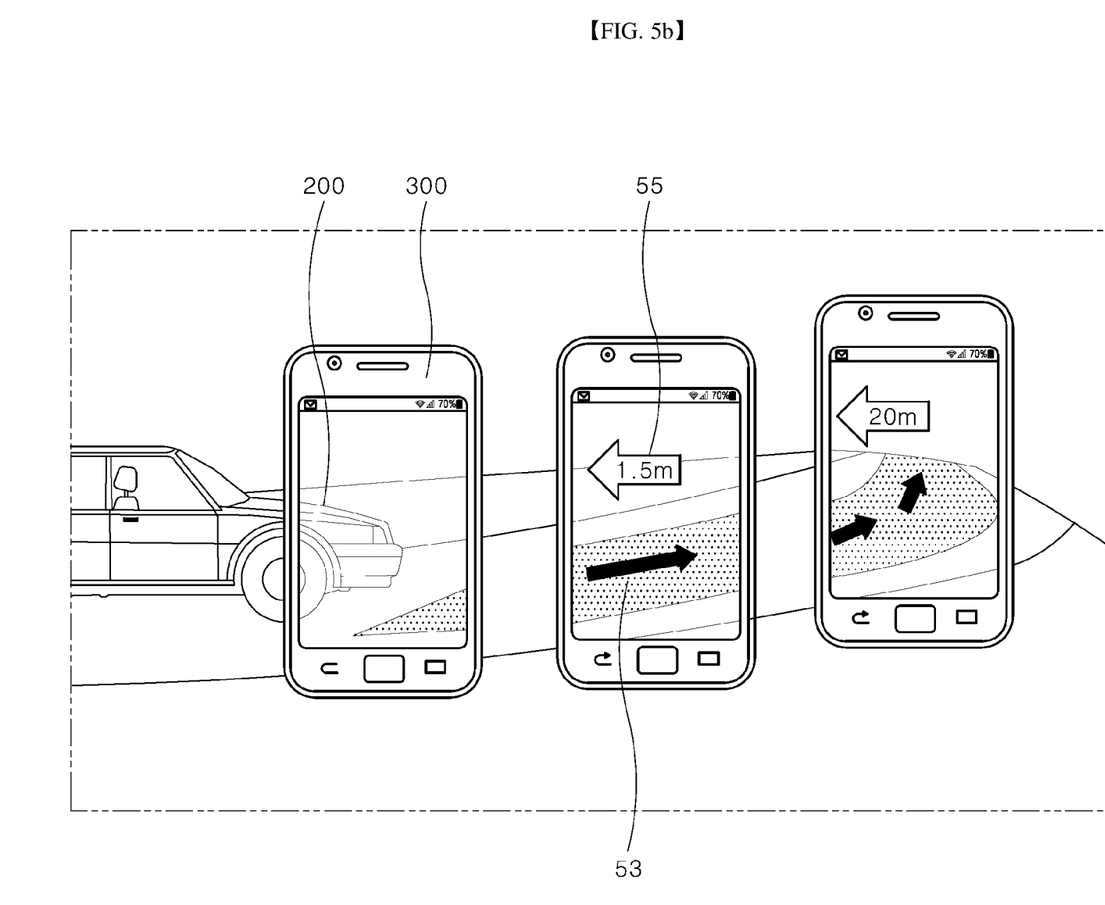
FIG. 5b is a view illustrating images recorded by a user terminal, which are displayed on the user terminal, and augmented images displayed in the recorded images, in a monitoring mode.

FIG. 5a is a view illustrating images recorded by an autonomous vehicle, which are displayed on a user terminal, and augmented images displayed on the recorded images, in a monitoring mode, and FIG. 5b is a view illustrating images recorded by a user terminal, which are displayed on the user terminal, and augmented images displayed in the recorded images, in a monitoring mode.

Figure 6:
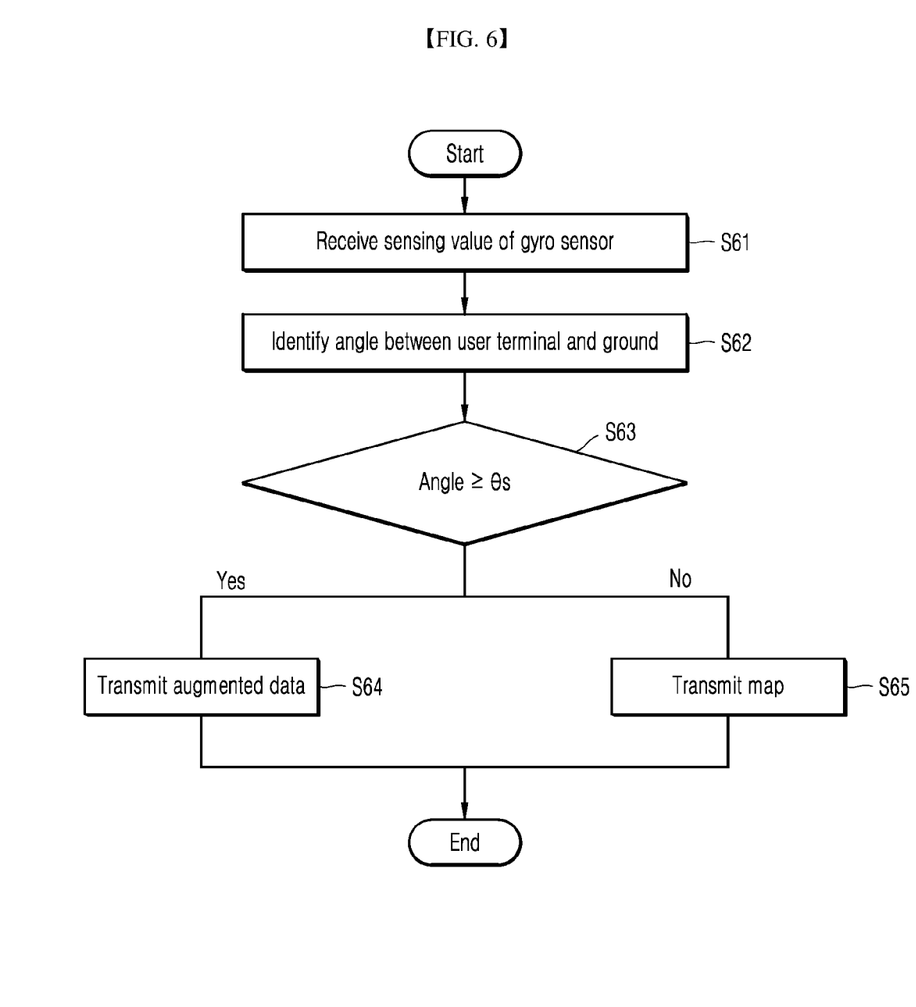
FIG. 6 is a flow chart illustrating a process of transmitting augmented data or a map to a user terminal on the basis of angles formed by the user terminal and the ground in a monitoring mode.

FIG. 6 is a flow chart illustrating a process of transmitting augmented data or a map to a user terminal on the basis of angles formed by the user terminal and the ground in a monitoring mode.

Figure 7A:
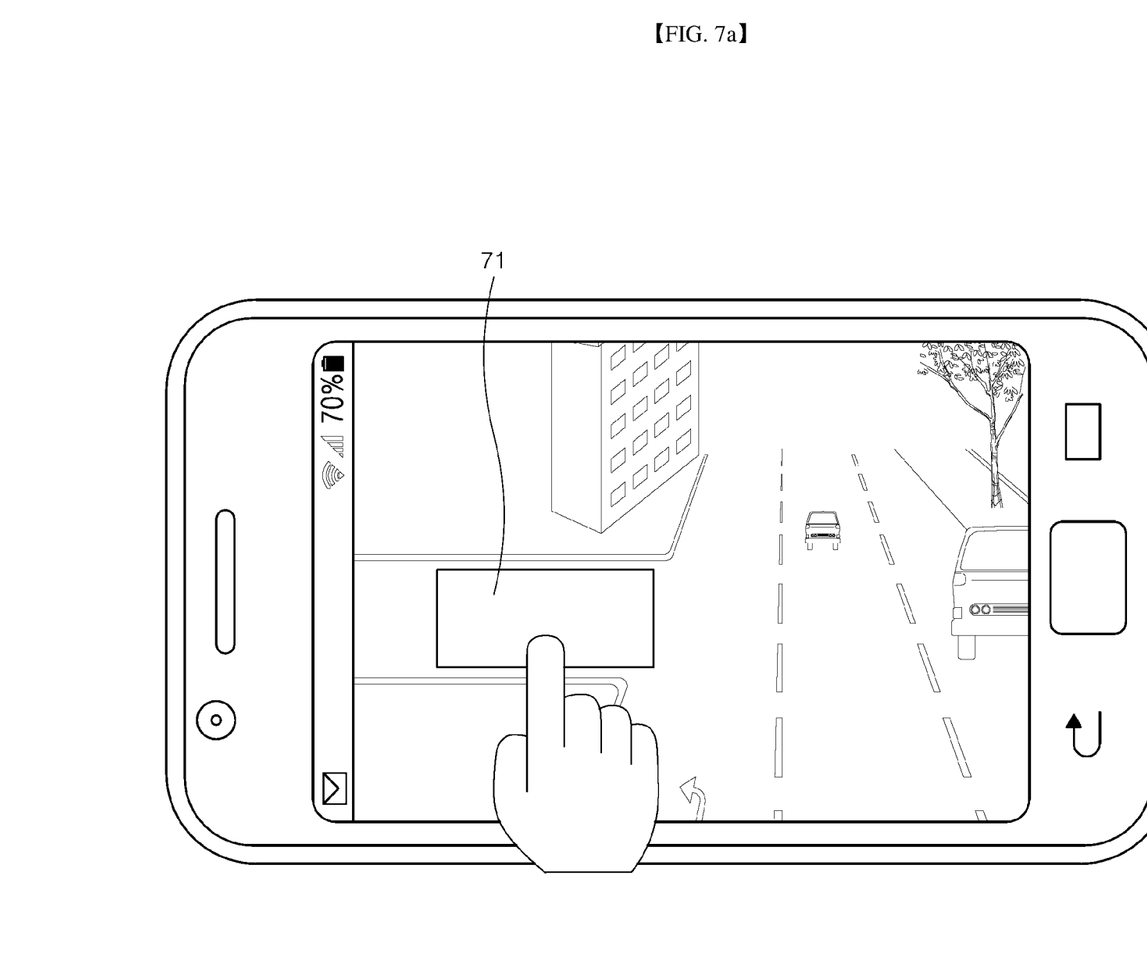
FIGS. 7a and 7b are views illustrating images recorded by an autonomous vehicle, which are displayed on a user terminal, and user manipulation for controlling the autonomous vehicle, in a controlling mode.
Figure 7B:
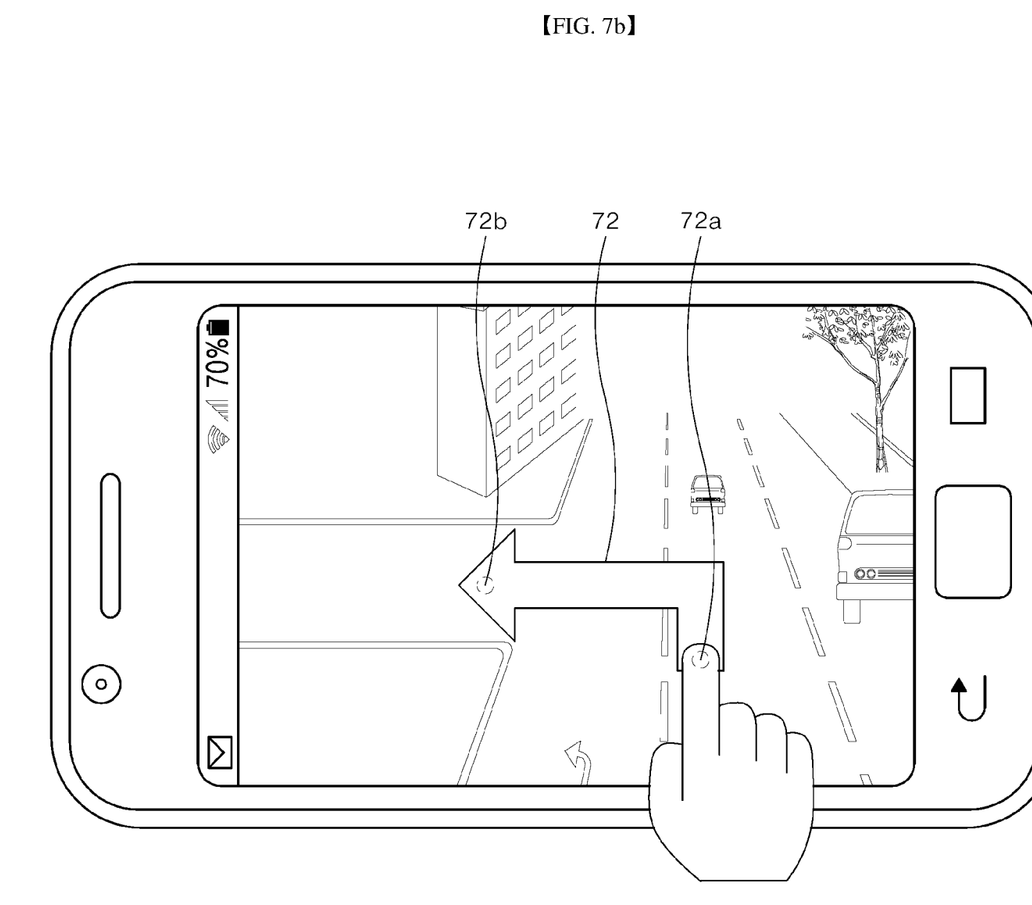

FIGS. 7a and 7b are views illustrating images recorded by an autonomous vehicle, which are displayed on a user terminal, and user manipulation for controlling the autonomous vehicle, in a controlling mode.

Referring to FIG. 1, a system 1 for monitoring and controlling an autonomous vehicle 200 (hereinafter referred to as a monitoring and controlling system) according to an embodiment may include a server 100, an autonomous vehicle 200, and a user terminal 300. The monitoring and controlling system 1 illustrated in FIG. 1 is based on an embodiment, and elements thereof are not limited to the embodiment illustrated in FIG. 1. When necessary, some elements may be added, modified or removed.

The server 100, the autonomous vehicle 200, and the user terminal 300, which constitute the monitoring and controlling system 1, may connect to a wireless network and may perform data communication with one another. In the present disclosure, the user terminal 300, as a terminal of a user who alighted from an autonomous vehicle 200, may be any display devices capable of displaying images such as smart phones, tablets and the like.

The autonomous vehicle 200 denotes a vehicle to which an autonomous driving algorithm for allowing a vehicle to drive itself to a destination without a driver's operation is applied. The autonomous vehicle 200 may be controlled directly by a driver or may be controlled by control signals transmitted by a server 100. The autonomous vehicle 200 may include any transportation means such as automobiles, motorcycles and the like, but below, denotes automobiles for convenience of description.

The server 100 may be built on the basis of a cloud, may store and manage information collected from the autonomous vehicle 200 and the user terminal 300 that connect to a wireless network, and may control driving of the autonomous vehicle 200 on the basis of the collected information.

Referring to FIG. 2, the server 100 may include a path generating module 110, a vehicle managing module 120, a database 130, and a first communication module 140. Additionally, the autonomous vehicle 200 may include a human machine interface 210 (HMI), an autonomous driving module 220, a global positioning system (GPS) module 230, a first camera module 240, a user detection sensor 250, and a second communication module 260. Further, the user terminal 300 may include a third communication module 310, a second camera module 320, a gyro sensor 330, and a display module 340.

The internal configurations of the server 100, the autonomous vehicle 200, and the user terminal 300 illustrated in FIG. 2 are provided only as examples, and elements thereof are not limited to the examples in FIG. 2. When necessary, some elements may be added, modified or removed.

Each of the elements in the server 100, the autonomous vehicle 200 and the user terminal 300 may be implemented as at least one physical element among application specific integrated circuits (ASICs), digital signal processors (DSPs), digital signal processing devices (DSPDs), programmable logic devices (PLDs), field programmable gate arrays (FPGAs), processors, controllers, micro-controllers, and microprocessors.

Referring to FIG. 3, a method for monitoring and controlling an autonomous vehicle 200 (hereinafter referred to as monitoring and controlling method) according to an embodiment may include receiving user alighting information (S10), and identifying whether a destination of the autonomous vehicle 200 is set (S20).

Additionally, the monitoring and controlling method may include determining an operating mode of the user terminal 300 as a monitoring mode (S30), and determining an operating mode of the user terminal 300 as a controlling mode (S50), on the basis of whether a destination is set.

Further, when a mode of the user terminal 300 is in the monitoring mode, the monitoring and controlling method may include transmitting a driving state of the autonomous vehicle 200 to the user terminal 300 (S40). On the contrary, when a mode of the user terminal 300 is in the controlling mode, the monitoring and controlling method may include transmitting a control signal, corresponding to user manipulation inputted to the user terminal 300, to the autonomous vehicle 200 (S60).

The monitoring and controlling method may be performed by the above-described server 100, and the server 100 may perform data communication with the autonomous vehicle 200 and the user terminal 300 to carry out the operation in each of the steps in FIG. 3.

Communications modules included in each of the elements may be used in a below-described process of data communication of the server 100, the autonomous vehicle 200 and the user terminal 300. Specifically, the server 100 may perform data communication with the autonomous vehicle 200 and the user terminal 300 using the first communication module 140, the autonomous vehicle 200 may perform data communication with the server 100 and the user terminal 300 using the second communication module 260, and the user terminal 300 may perform data communication with the server 100 and the autonomous vehicle 200 using the third communication module 310.

Below, each step that is described above is specifically described with reference to the attached drawings.

A vehicle managing module 120 in a server 100 may receive user alighting information for an autonomous vehicle 200 (S10). The user alighting information, as a signal indicating a user alights from an autonomous vehicle 200, may be generated by at least one of an autonomous vehicle 200 and a user terminal 300.

As an example, the autonomous vehicle 200 may generate user alighting information on the basis of results of sensing a user with a user detection sensor 250. The autonomous vehicle 200 may include at least one user detection sensor 250 for sensing a user, therein. Specifically, the autonomous vehicle 200 may include an infrared sensor, a pressure sensor, a proximity sensor and the like, therein.

The infrared sensor may sense a user inside the autonomous vehicle 200 by detecting infrared rays emitted from the human body, the pressure sensor may sense a user inside the autonomous vehicle 200 by measuring pressure based on weight of the user, and the proximity sensor may sense a user inside the autonomous vehicle 200 by detecting a distance between the human body and the sensor.

In addition to the above-described sensors, the autonomous vehicle 200 may include various sensors employed in the art to which the present disclosure pertains to sense a user, therein.

The user detection sensor 250 may generate user alighting information when a user is not detected, and the second communication module 260 may transmit the user alighting information to the server 100. Through the process, the server 100 may receive the user alighting information from the autonomous vehicle 200.

As another example, an HMI 210 of the autonomous vehicle 200 may receive a user alighting signal, and may generate user lighting information on the basis of the user alighting signal.

As illustrated in FIG. 2, the autonomous vehicle 200 may include an HMI 210, therein. The HMI 210 may perform the function of outputting information on a vehicle or on the state of a vehicle to a driver visually and acoustically through a plurality of physical interfaces. Additionally, the HMI 210 may receive various types of user manipulation, to control the autonomous vehicle 200, and may output driving information to a user. To this end, the HMI 210 may include a plurality of input and output modules.

A user may input a user alighting signal through an interface supplied by the HMI 210. When the user alighting signal is inputted, the HMI 210 may generate user alighting information and may transmit the generated user alighting information to the server 100. Through the process, the server 100 may receive user alighting information from the autonomous vehicle.

As yet another example, the user terminal 300 may generate user alighting information on the basis of the user manipulation inputted from the user. An application in relation to the monitoring and controlling the autonomous vehicle 200 (hereinafter referred to as autonomous driving application) may be previously installed in the user terminal 300. The autonomous driving application may supply an interface for receiving user manipulation, and the user may input user manipulation through the interface.

For example, a user may input user manipulation indicating a drop-off of a user through an interface supplied by the autonomous driving application when the user alights from the autonomous vehicle 200. Accordingly, the autonomous driving application may generate user alighting information, and the third communication module 310 may transmit the user alighting information to the server 100. Through the process, the server 100 may receive user alighting information from the user terminal 300.

When receiving the user alighting information, the server 100 may identify whether a destination of the autonomous vehicle 200 is set (S20). In other words, the server 100 may identify whether a destination is set only when receiving user alighting information. In order to exactly find out a drop-off of a user, the server 100 may also identify whether a destination is set only when receiving user alighting information from all of the autonomous vehicle 200 and the user terminal 300.

The server 100 may identify whether a destination of the autonomous vehicle 200 is set by performing data communication with the autonomous vehicle 200 or the user terminal 300. The question whether a destination is set may denote whether a destination is set for the autonomous vehicle 200 from which a user alights.

As an example, the server 100 may receive destination information set by the user through the HMI 210 in the autonomous vehicle 200 and may identify whether a destination is set on the basis of the received destination information.

A user may input destination information through the HMI 210. The destination information may include the location of at least one destination and a driving path to the destination. When destination information is inputted through the HMI 210 in a vehicle, the user may input the destination information before a drop-off of the user.

The server 100 may receive the destination information inputted through the HMI 210 by performing data communication with the autonomous vehicle 200, and may identify whether a destination is set currently for the autonomous vehicle 200 on the basis of the received destination information. The destination information received by the server 100 may be stored in the database 130 in the server 100.

The destination information may be inputted through the HMI 210 before a drop-off of the user. Accordingly, the server 100 may identify whether a destination of the autonomous vehicle 200 is set immediately after receiving the user alighting information.

As another example, the server 100 may receive destination information set by the user through an autonomous driving application installed in the user terminal 300, and may identify whether a destination is set on the basis of the received destination information.

The autonomous driving application, as described above, may supply an interface for receiving user manipulation, and the user may input destination information through the interface. When destination information is inputted through the autonomous driving application executed in the user terminal 300, the user may input the destination information before or after a drop-off of the user.

The server 100 may receive the destination information inputted through the autonomous driving application by performing data communication with the user terminal 300, and may identify whether a destination is currently set for the autonomous vehicle 200 on the basis of the received destination information. Likewise, the destination information received by the server 100 may be stored in the database 130 in the server 100.

Even when destination information is inputted through the autonomous driving application after a drop-off of the user, the server 100 may identify whether a destination is set, regularly and continuously from the point in time when receiving user alighting information, to identify whether the destination of the autonomous vehicle 200 is set.

The server 100 may determine the operating mode of the user terminal 300 as a monitoring mode or a controlling mode on the basis of whether a destination is set.

Specifically, the server 100 may determine the operating mode of the user terminal 300 as a monitoring mode when a destination is set for the autonomous vehicle 200 (S30). On the contrary, the server 100 may determine the operating mode of the user terminal 300 as a controlling mode when a destination is not set for the autonomous vehicle 200 (S50).

According to the above-described method, the server 100 may receive destination information from the autonomous vehicle 200 or the user terminal 300. When the received destination information includes at least one destination, the server 100 may identify the autonomous vehicle 200 as being in a destination-set state. On the contrary, when the received destination information includes no destination, the server 100 may identify the autonomous vehicle 200 as being in a no destination-set state.

When the autonomous vehicle 200 is in the destination-set state, the server 100 may determine the operating mode of the user terminal 300 as a monitoring mode (S30), and when the autonomous vehicle 200 is in the no destination-set state, the server 100 may determine the operating mode of the user terminal 300 as a controlling mode (S50).

The server 100 may transmit a driving state of the autonomous vehicle 200 to the user terminal 300 (S40), or may transmit a control signal, corresponding to user manipulation inputted to the user terminal 300, to the autonomous vehicle 200 (S60), on the basis of the operating mode of the user terminal 300.

Specifically, when the operating mode of the user terminal 300 is in a monitoring mode, the server 100 may transmit a driving state of the autonomous vehicle 200 to the user terminal 300 (S40), and when the operating mode of the user terminal 300 is in a controlling mode, the server 100 may transmit a control signal, corresponding to user manipulation inputted to the user terminal 300, to the autonomous vehicle 200 (S60).

First, the case in which the operating mode of the user terminal 300 is in a monitoring mode is described.

When the operating mode of the user terminal 300 is in a monitoring mode, the server 100 may transmit a driving state of the autonomous vehicle 200 to the autonomous driving application in the user terminal 300 (S40). The driving state, as any information on driving of the autonomous vehicle 200, may include at least one of the location, driving path, external images, driving information (e.g., speeds, amounts of fuel, real-time fuel efficiency and the like) of the autonomous vehicle 200.

As described above, a destination may be set for the autonomous vehicle 200 in the monitoring mode. A path generating module 110 in the autonomous vehicle 200 may generate a driving path to the destination, and may transmit the generated driving path to the autonomous vehicle 200.

Specifically, the path generating module 110 may identify the location of the destination on the basis of destination information stored in the database 130. Additionally, the path generating module 110 may identify the current location of the autonomous vehicle 200 through the GPS module 230 of the autonomous vehicle 200. Next, the path generating module 110 may generate a driving path from the current location of the autonomous vehicle 200 to the location of the destination.

The path generating module 110 may generate a driving path on the basis of traffic condition information. To this end, the path generating module 110 and a traffic information server 400 may connect to a network, and may receive current traffic information from the traffic information server 400. The traffic information server 400, as a server 100 that manages information on traffic in real time such as information on roads, traffic congestion, road surface condition and the like, may be a server 100 managed nationally or privately.

Any methods employed in the art to which the present disclosure pertains may be applied to a method generating a driving path by reflecting traffic condition information. Accordingly, detailed description is omitted.

The driving path may be implemented as a map including path guiding information, and specifically, may be implemented as a high definition (HD) map including a three-dimensional topography data.

The path generating module 110 may transmit the generated driving path to an autonomous driving module 220 in the autonomous vehicle 200. The autonomous driving module 220 may control driving of the autonomous vehicle 200 on the basis of the driving path received from the path generating module 110.

Algorithms for maintaining a distance between vehicles, preventing the autonomous vehicle 200 from escaping from the lane, tracking the lane, detecting signals, detecting a pedestrian, detecting a structure, sensing traffic conditions, autonomous parking and the like may be applied to driving control of the autonomous vehicle 200. In addition to the above-described algorithms, various algorithms employed in the art to which the disclosure pertains may be applied to autonomous driving.

The autonomous vehicle 200 may travel to a destination along the driving path on the basis of the control by the autonomous driving module 220 without additional user manipulation after a drop-off of the user.

In this case, a vehicle managing module 120 in the server 100 may transmit a driving state of the autonomous vehicle 200 to the autonomous driving application in the user terminal 300.

Referring to FIG. 4, the vehicle managing module 120 may transmit a map, and data showing the location of the autonomous vehicle 200 to the autonomous driving application. Additionally, the vehicle managing module 120 may transmit data showing the driving path of the autonomous vehicle 200 to the autonomous driving application. The autonomous driving application may display a map 41, and the location 42 and driving path 43 of the autonomous vehicle 200 in the map through a display module 340 in the user terminal 300 on the basis of the received data.

The vehicle managing module 120 in the server 100 may transmit augmented data corresponding to a driving state of the autonomous vehicle 200 to the user terminal 300. In this case, the augmented data may be expressed as an augmented image showing a driving state of the autonomous vehicle 200 in an external image recorded by the autonomous vehicle 200 and displayed on the user terminal 300.

Specifically, the vehicle managing module 120 may transmit augmented data corresponding to a driving state of the autonomous vehicle 200 to the autonomous driving application in the user terminal 300.

The autonomous vehicle 200 may record an external image through a first camera module 240, and the recorded external image may be transmitted to the user terminal 300 through the server 100. The autonomous driving application in the user terminal 300 may display the external image recorded by the autonomous vehicle 200 through the display module 340.

In this case, the autonomous driving application may augment and display augmented data received from the vehicle managing module 120 in the server 100 in an external image displayed through the display module 340.

Referring to FIG. 5a, the vehicle managing module 120 may transmit augmented data showing speeds of the autonomous vehicle 200, road speed limits, driving paths of the autonomous vehicle 200, and arrows indicating driving directions, to the autonomous driving application.

The autonomous driving application may augment and display the speed 51 of the autonomous vehicle 200, the speed limit 52 of the road on which the autonomous vehicle 200 is currently located, the driving path 53 of the autonomous vehicle 200, an arrow 54 indicating a driving direction on the display module 340, in which the external image recorded by the autonomous vehicle 200 is displayed, on the basis of the received augmented data.

Unlike the example described above, the augmented data may also be expressed as an augmented image showing a driving state of the autonomous vehicle 200 in an image recorded by the user terminal 300 and displayed on the user terminal 300.

Like the example described above, the vehicle managing module 120 may transmit augmented data corresponding to a driving state of the autonomous vehicle 200 to the autonomous driving application in the user terminal 300.

The user terminal 300 may record an image through a second camera module 320, and the autonomous driving application may display the image, recorded through the second camera module 320, through the display module 340.

In this case, the autonomous driving application may augment and display the augmented data, received from the vehicle managing module 120 in the server 100, in an image being displayed through the display module 340.

Referring to FIG. 5b, the vehicle managing module 120 may transmit augmented data showing a location/distance indicating arrow 55 of the autonomous vehicle 200, and the driving path 53 of the autonomous vehicle 200, to the autonomous driving application.

To this end, the vehicle managing module 120 may identify the autonomous vehicle 200 in the image recorded by the user terminal 300. To identify the autonomous vehicle 200, a scale-invariant feature transform (SIFT) algorithm, a speeded-up robust features (SURF) algorithm, a ferns algorithm and the like for identifying an object in an image may be applied to the vehicle managing module 120.

The vehicle managing module 120 may calculate a distance between the autonomous vehicle 200 and the user terminal 300 on the basis of location information received by the GPS module provided in each of the autonomous vehicle 200 and the user terminal 300. Additionally, the vehicle managing module 120 may receive left and right angles (roll) of the user terminal 300 through a gyro sensor 330 in the user terminal 300. The vehicle managing module 120 may calculate a distance between a focal point of the image recorded by the second camera module 320 and the autonomous vehicle 200 using a distance between the autonomous vehicle 200 and the user terminal 300, an angle of the user terminal 300, and a focal distance of the second camera module 320.

The vehicle managing module 120 may generate augmented data for displaying the calculated distance between a focal point of the image and the autonomous vehicle 200 toward the autonomous vehicle 200, and may transmit the generated augmented data to the autonomous driving application.

As illustrated in FIG. 5b, the autonomous driving application may augment and display a location/distance indicating arrow 55 for indicating the location of the autonomous vehicle 200, and a distance from the recorded image to the autonomous vehicle 200, and may augment and display the driving path 53 of the autonomous vehicle 200, in the display module 340, in which the image recorded by the user terminal 300 is being displayed, on the basis of the received augmented data.

The present disclosure, as described above, may allow the user to confirm various pieces of information on the vehicle that is moving autonomously by transmitting a driving state of the autonomous vehicle 200 to the user terminal 300 in the monitoring mode.

The server 100 in the monitoring mode may identify an angle between the user terminal 300 and the ground through the gyro sensor 330 in the user terminal 300. Next, the server 100 may transmit a map, on which a driving state of the autonomous vehicle 200 is displayed, to the user terminal 300, or may transmit augmented data, which display a driving state of the autonomous vehicle 200 in the image recorded by the user terminal 300, to the user terminal 300, on the basis of the identified angle.

Specifically, referring to FIG. 6, the server 100 may receive a sensing value of the gyro sensor 330 in the user terminal 300 (S61).

A gyro sensor 330 may be provided in the user terminal 300. The gyro sensor 330 may generate a sensing value by measuring an orthogonal rotation angle (pitch) of the user terminal 300 with respect to the horizontal direction. The user terminal 300 may transmit the sensing value measured by the gyro sensor 330 to the server 100.

The server 100 may identify an angle between the user terminal 300 and the ground on the basis of the received sensing value (S62). In other words, the server 100 may identify an angle between the user terminal 300 and the ground on the basis of a perpendicular gradient of the user terminal 300 measured by the gyro sensor 330.

Next, the server 100 may compare the identified angle and a preset angle (θs) (S63), and on the basis of results of comparison, may transmit different data to the user terminal 300.

Specifically, when the identified angle is greater than or equal to a preset angle (θs), the server 100 may transmit augmented data, which display a driving state of the autonomous vehicle 200 in the image recorded by the user terminal 300, to the user terminal 300 (S64). On the contrary, when the identified angle is less than the preset angle (θs), the server 100 may transmit a map, on which a driving state of the autonomous vehicle 200 is displayed, to the user terminal 300 (S65).

The user having alighted from the autonomous vehicle 200 may monitor the autonomous vehicle 200 with the angle between the user terminal 300 and the ground greater than or equal to the preset angle (θs) (e.g., holding the user terminal 300 perpendicularly to record the autonomous vehicle 200). In this case, the server 100 may transmit augmented data, which display a driving state of the autonomous vehicle 200 in the image recorded by the user terminal 300, to the user terminal 300.

A method, by which the autonomous driving application installed in the user terminal 300 displays augmented data in the image recorded by the user terminal 300, is described above with reference to FIG. 5b. Accordingly, detailed description is omitted.

On the contrary, the user having alighted from the autonomous vehicle 200 may monitor the autonomous vehicle 200 with the angle between the user terminal 300 and the ground less than the preset angle (θs) (e.g., placing the user terminal 300 horizontally). In this case, the server 100 may transmit a map, on which a driving state of the autonomous vehicle 200 is displayed, to the user terminal 300. Additionally, the server 100, as described with reference to FIG. 4, may also transmit the location and driving path of the autonomous vehicle 200 in the map.

The autonomous driving application installed in the user terminal 300 may display the map, and the location and the driving path of the autonomous vehicle 200, which are received from the server 100. Description in relation to this is provided above. Accordingly, detailed description is omitted.

That is, when the user terminal 300 is kept horizontal such that the user may monitor the autonomous vehicle 200, a map-based driving state of the autonomous vehicle 200 may be displayed on the user terminal 300. On the contrary, when the user terminal 300 is kept perpendicular such that the user may record the autonomous vehicle 200 for a monitor, a driving state of the autonomous vehicle 200 based on the image recorded by the user terminal 300 may be displayed on the user terminal 300.

The present disclosure, as described above, may provide a high-quality user experience by transmitting a map on which a driving state of the autonomous vehicle 200 is displayed, or augmented data that display a driving state of the autonomous vehicle 200 to the user terminal 300, on the basis of an angle between the user terminal 300 and the ground, in the monitoring mode, and by providing information in accordance with the user's intention toward monitoring methods.

Next, the case in which the operating mode of the user terminal 300 is in a controlling mode is described.

When the operating mode of the user terminal 300 is in a controlling mode, the server 100 may transmit a control signal, corresponding to user manipulation inputted to the user terminal 300, to the autonomous vehicle 200 (S60). The user manipulation may be inputted through any interface supplied by the user terminal 300, and for example, may be inputted by a touch of the user. Additionally, the control signal may be a signal for controlling driving of the autonomous vehicle 200, and the autonomous vehicle 200 may move on the basis of the control signal supplied by the server 100.

The server 100 may transmit an external image recorded by the camera module in the autonomous vehicle 200 to the user terminal 300. The autonomous driving application installed in the user terminal 300 may output the external image transmitted by the server 100 through the display module 340.

Next, the server 100 may receive user manipulation through the user terminal 300 on which the external image is displayed.

The autonomous driving application may receive user manipulation (e.g., touch) through the display module 340 on which the external image is displayed. The autonomous driving application may transmit the inputted user manipulation to the server 100.

The server 100 may receive the user manipulation and may transmit a control signal corresponding to the received user manipulation to the autonomous vehicle 200. The user manipulation may include information on a driving direction, a target location and the like of the autonomous vehicle 200.

When a driving direction of the autonomous vehicle 200 is user manipulation, the control signal may be a signal for moving the autonomous vehicle 200 in the driving direction. Additionally, when a target location of the autonomous vehicle 200 is user manipulation, the control signal may be a signal for moving the autonomous vehicle 200 to the target location.

As an example, referring to FIG. 7a, the external image recorded by the autonomous vehicle 200 may be outputted to the display module 340 of the user terminal 300 in the controlling mode. In the controlling mode, a destination is not set. Accordingly, the autonomous vehicle 200 may not drive itself without user manipulation.

The user may input a target location 71 of the autonomous vehicle 200 by a touch through the display module 340 in which an external image is being outputted. The server 100 may receive the target location 71 inputted through user manipulation, may generate a control signal corresponding to the target location 71 and may transmit the control signal to the autonomous vehicle 200. In this case, the control signal may be a signal for moving the autonomous vehicle 200 from the current location to the target location 71.

Specifically, the path generating module 110 in the server 100 may generate a driving path from the current location of the autonomous vehicle 200 to the target location 71 and may transmit the generated driving path to the autonomous vehicle 200. The autonomous driving module 220 in the autonomous vehicle 200 may move the autonomous vehicle 200 along the driving path transmitted from the sever 100.

As another example, referring to FIG. 7b, the user may input a driving direction 72 of the autonomous vehicle 200 by a touch through the display module 340 in which an external image is being outputted. Specifically, the user may input a driving direction 72 by a continuous touch (e.g. dragging) including a start point 72a and an end point 72b.

The server 100 may receive the driving direction 72 inputted through user manipulation, may generate a control signal corresponding to the driving direction, and may transmit the control signal to the autonomous vehicle 200 (S60). In this case, the control signal may be a signal for moving the autonomous vehicle 200 to the location of the end point 72b along a path connecting the start point 72a and the end point 72b.

Specifically, the path generating module 110 in the server 100 may generate a driving path including a path connecting the start point 72a and the end point 72b, as a driving path from the current location of the autonomous vehicle 200 to the end point 72b, and may transmit the generated driving path to the autonomous vehicle 200. The autonomous driving module 220 in the autonomous vehicle 200 may move the autonomous vehicle 200 along the driving path transmitted from the sever 100.

The present disclosure, as described above, may enhance efficiency and convenience of remote control over the autonomous vehicle 200 by controlling the autonomous vehicle 200 on the basis of user manipulation inputted to the user terminal 300 in the controlling mode.

Below, the process during which the operating mode of the user terminal 300 is converted from the monitoring mode to the controlling mode is specifically described.

When driving event-occurrence information is received from the autonomous vehicle 200, the server 100 may convert the operating mode of the user terminal 300 from a monitoring mode to a controlling mode. In other words, the server 100 may convert the operating mode of the user terminal 300 on the basis of the driving event-occurrence information received from the autonomous vehicle 200 that is autonomously moving to a destination.

When a preset driving event occurs, the autonomous driving module 220 in the autonomous vehicle 200 may generate driving event-occurrence information and may transmit the generated driving event-occurrence information to the server 100. The driving event may include an occasion on which a left turn or a right turn is required on roads without traffic signals, and an occasion on which driving is impossible along a driving path, and may also include a sudden stop, a collision and the like.

For example, when there is no traffic signal on a path requiring a left turn, or when an obstacle stands in a driving path, the autonomous vehicle 200 may stop autonomous driving, and may generate driving event-occurrence information and transmit the generated driving event-occurrence information to the server 100. The server 100 may convert the operating mode of the user terminal 300 from a monitoring mode to a controlling mode, and the user may directly control the autonomous vehicle 200 according to the method that is described with reference to FIGS. 7a and 7b.

Even though driving event-occurrence information is not received, the sever 100 may convert the operating mode of the user terminal 300 from a monitoring mode to a controlling mode when a rate of change in speeds of the autonomous vehicle 200 exceeds a preset value.

Specifically, the server 100 may calculate speeds of the autonomous vehicle 200 and may calculate a rate of change in the speeds of the autonomous vehicle 200 at regular intervals, using location information received through the GPS module 230 of the autonomous vehicle 200.

When the autonomous vehicle 200 is brought to a sudden stop, sudden unintended acceleration and the like, the rate of change in speeds may exceed the preset value. In this case, the server 100 may convert the operating mode of the user terminal 300 from the monitoring mode to the controlling mode. Accordingly, when the autonomous vehicle 200 is brought to a sudden stop or sudden unintended acceleration, the user may directly control the autonomous vehicle 200 according to the method that is described with reference to FIGS. 7a and 7b.

Additionally, the server 100 may convert the operating mode from the monitoring mode to the controlling mode when the location of the autonomous vehicle 200 is the same during a preset period.

Specifically, the server 100 may identify the location of the autonomous vehicle 200 by receiving location information through the GPS module 230 of the autonomous vehicle 200 on the basis of a preset cycle.

The autonomous vehicle 200 may stop due to the occurrence of a driving event. Accordingly, the location of the autonomous vehicle 200, identified by the server 100, may be the same for more than a preset period. In this case, the server 100 may convert the operating mode of the user terminal 300 from the monitoring mode to the controlling mode. Accordingly, the user may control the autonomous vehicle 200 according to the method that is described with reference to FIGS. 7a and 7b when the autonomous vehicle 200 stops due to external factors.

The present disclosure, as described above, may allow the user to directly intervene with exceptional cases that occur to the autonomous vehicle 200 on the road, by allowing the user to control the autonomous vehicle 200 when a driving event occurs to the vehicle that is moving autonomously.

Finally, the present disclosure may allow the user to confirm the driving state of the autonomous vehicle 200 and to remotely control the autonomous vehicle 200 without spatial and temporal constraints by allowing the user to monitor or control the autonomous vehicle 200 after a drop-off of the user.

The present disclosure may be replaced, modified and changed in different forms by one having ordinary skill in the art to which the disclosure pertains within the technical spirit of the disclosure. Thus, the present disclosure should not be construed as being limited to the embodiments and drawings set forth herein.

The invention claimed is:

1. A method for monitoring and controlling an autonomous vehicle, the method comprising:
    receiving user alighting information for the autonomous vehicle;
    identifying whether a destination of the autonomous vehicle from which the user alighted is set;
    determining an operating mode of a user terminal as being a monitoring mode or a controlling mode based on whether the destination is set;
    transmitting a driving state of the autonomous vehicle to the user, terminal based on the operating mode being the monitoring mode; and
    transmitting a control signal corresponding to user manipulation received from the user terminal to the autonomous, vehicle based on the operating mode being the controlling mode; and
    controlling the autonomous vehicle based on the user manipulation in the controlling mode,
    wherein determining the operating mode of the user terminal comprises:

determining the operating mode of the user terminal as being the monitoring mode based on the destination being set; and determining the operating mode of the user terminal as being the controlling mode based on the destination being not set, and wherein transmitting the driving state of the autonomous vehicle to the user terminal comprises:

identifying an angle between the user terminal and the ground through a gyro sensor in the user terminal;

transmitting a map, on which the driving state of the autonomous vehicle is displayed, to the user terminal based on the identified angle being less than a preset angle; and transmitting augmented data, which display the driving state of the autonomous vehicle in an image recorded by the user terminal, to the user terminal based on the identified angle being greater than or equal to the preset angle.

2. The method of claim 1, wherein the autonomous vehicle generates the user alighting information based on results of sensing a user using a user detection sensor, and receiving the user alighting information for the autonomous vehicle comprises receiving the user alighting information from the autonomous vehicle.

3. The method of claim 1, wherein the user terminal generates the user alighting information based on user manipulation inputted by a user, receiving the user alighting information for the autonomous vehicle comprises receiving the user alighting information from the user terminal.

4. The method of claim 1, wherein identifying whether the destination is set for the autonomous vehicle comprises receiving destination information set by a user through a human machine interface (HMI) in the autonomous vehicle, and identifying whether the destination is set based on the received destination information.

5. The method of claim 1, wherein identifying whether the destination is set for the autonomous vehicle comprises receiving destination information set by a user through an autonomous driving application installed in the user terminal, and identifying whether the destination is set based on the received destination information.

6. The method of claim 1, wherein transmitting the driving state of the autonomous vehicle to the user terminal comprises transmitting at least one of a location, a driving path, an external image, or driving information of the autonomous vehicle.

7. The method of claim 6, wherein transmitting the driving state of the autonomous vehicle to the user terminal further comprises transmitting augmented data corresponding to the driving state of the autonomous vehicle to the user terminal, wherein the augmented data are expressed as an augmented image showing the driving state of the autonomous vehicle in an external image recorded by the autonomous vehicle and displayed on the user terminal.

8. The method of claim 6, wherein transmitting the driving state of the autonomous vehicle to the user terminal further comprises transmitting augmented data corresponding to the driving state of the autonomous vehicle to the user terminal, wherein the augmented data are expressed as an augmented image showing the driving state of the autonomous vehicle in the image recorded by the user terminal and displayed on the user terminal.

9. The method of claim 1, wherein transmitting the control signal corresponding to the user manipulation, comprises:

transmitting an external image recorded by a camera module in the autonomous vehicle to the user terminal;

receiving the user manipulation through the user terminal on which the external image is displayed; and transmitting a control signal corresponding to the received user manipulation to the autonomous vehicle.

10. The method of claim 1, further comprising converting the operating mode from the monitoring mode to the controlling mode based on driving event-occurrence information being received from the autonomous vehicle.

11. The method of claim 1, further comprising converting the operating mode from the monitoring mode to the controlling mode based on a rate of change in speeds of the autonomous vehicle exceeding a preset value.

12. The method of claim 1, further comprising converting the operating mode from the monitoring mode to the controlling mode based on a location of the autonomous vehicle being the same during a preset period.

* * * * *